US012569891B2

(12) United States Patent
Sato et al.

(10) Patent No.: US 12,569,891 B2
(45) Date of Patent: Mar. 10, 2026

(54) SUBSTRATE PROCESSING DEVICE, POLISHING DEVICE, AND SUBSTRATE PROCESSING METHOD

(71) Applicant: EBARA CORPORATION, Tokyo (JP)

(72) Inventors: Kohei Sato, Tokyo (JP); Koichi Fukaya, Tokyo (JP); Hiroki Takahashi, Tokyo (JP); Daichi Kondo, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 18/490,727

(22) Filed: Oct. 19, 2023

(65) Prior Publication Data

US 2024/0139782 A1 May 2, 2024

(30) Foreign Application Priority Data

Oct. 31, 2022 (JP) ................................ 2022-174942

(51) Int. Cl.
*B08B 3/14* (2006.01)
*B08B 13/00* (2006.01)

(52) U.S. Cl.
CPC ................ *B08B 3/14* (2013.01); *B08B 13/00* (2013.01); *B08B 2203/007* (2013.01)

(58) Field of Classification Search
CPC ..... B08B 3/14; B08B 13/00; B08B 2203/007; H01L 21/67046; H01L 21/02057; H01L 21/67092; H01L 21/6704; H01L 21/67109; F16K 31/06; F16L 9/06
USPC .......................................................... 134/109
See application file for complete search history.

(56) References Cited

U.S. PATENT DOCUMENTS 5,711,809 A * 1/1998 Kimura .................. B05B 14/00 118/663
6,333,003 B1 * 12/2001 Katano ............ H01L 21/67178 454/55
6,750,668 B1 * 6/2004 Johnson ........... H01L 21/67109 324/750.28
9,216,442 B2 * 12/2015 Aizawa .............. B01D 19/0057
9,616,360 B2 * 4/2017 Ushimaru .......... B01D 19/0047
11,285,517 B2 * 3/2022 Tanaka .................... B24B 37/11
2004/0162004 A1 * 8/2004 Wakazono .............. B24B 41/02 451/7

(Continued)

FOREIGN PATENT DOCUMENTS

JP 2002043267 2/2002
JP 2002222791 8/2002
JP 2003124180 4/2003

(Continued)

*Primary Examiner* — Michael E Barr
*Assistant Examiner* — Thomas Bucci
(74) *Attorney, Agent, or Firm* — JCIPRNET

(57) ABSTRACT

Provided are a substrate processing device, a polishing device, and a substrate processing method. The substrate processing device includes a processing module for processing the substrate with a liquid, and a gas-liquid separation tank connected to the exhaust outlet of the processing module, which separates the liquid from the exhaust received from the processing module and releases the exhaust into an exhaust duct. The gas-liquid separation tank includes a tank body, a heat exchanger arranged inside the tank body and cools the exhaust, and an air nozzle arranged inside the tank body and supplies air to cool the exhaust.

17 Claims, 8 Drawing Sheets

(56) References Cited

U.S. PATENT DOCUMENTS

| | | | | |
|---|---|---|---|---|
| 2013/0240000 | A1* | 9/2013 | Aizawa | B01D 19/0057<br>96/209 |
| 2020/0147654 | A1* | 5/2020 | Tanaka | B08B 1/36 |

FOREIGN PATENT DOCUMENTS

| | | | | | |
|---|---|---|---|---|---|
| JP | 2010074191 | | | 4/2010 | |
| KR | 20060095594 | A | * | 9/2006 | H01L 21/67046 |
| KR | 20130003480 | U | * | 6/2013 | H01L 21/6704 |
| KR | 101508972 | B1 | * | 4/2015 | F24F 3/14 |

* cited by examiner

| Item | Step 1 | Step 2 | · · · | Step 4 |
|---|---|---|---|---|
| Process | DIW rinse | Chemical solution rinse | · · · | DIW rinse |
| Process time | t1 | t2 | · · · | t4 |
| · · · | · · · | · · · | · · · | |
| · · · | · · · | · · · | · · · | |
| · · · | · · · | · · · | · · · | |
| heated liquid | N | Y | · · · | Y |
| Cooling System | invalid | valid | · · · | valid |

FIG. 8

| | | Measures for the cooling system of this embodiment | |
|---|---|---|---|
| | | No | Yes |
| Exhaust duct | Temperature [°C] | 33 | 19 |
| | Humidity [°C] | 100 | 94 |
| | Exhaust speed [m/s] | 5.3 | 5.4 |

FIG. 9

SUBSTRATE PROCESSING DEVICE, POLISHING DEVICE, AND SUBSTRATE PROCESSING METHOD

CROSS-REFERENCE TO RELATED APPLICATION

This application claims the priority benefits of Japanese application no. 2022-174942, filed on Oct. 31, 2022. The entirety of the above-mentioned patent application is hereby incorporated by reference herein and made a part of this specification.

BACKGROUND

Technical Field

This application relates to a substrate processing device, a polishing device, and a substrate processing method. In one example, this application relates to a substrate cleaning device and a substrate cleaning method that clean a substrate such as a semiconductor wafer while supplying a processing liquid. The substrate cleaning device and method according to one example are applicable not only to manufacturing processes of memory elements and logic elements of semiconductors, but also to manufacturing processes of flat panel displays, and manufacturing processes of image sensors such as CMOS and CCD.

Related Art

In the manufacturing process of semiconductor elements, various films with different physical properties are formed on a silicon wafer substrate, and fine wiring is formed by performing various processing on these films. For example, in the damascene process, metal wiring is formed by forming a wiring groove in the film, embedding metal such as Cu in this wiring groove, and removing excess metal by chemical mechanical polishing (CMP). Since components of the polishing agent and polishing debris remain on the surface of the substrate after CMP processing, it is necessary to remove them with a substrate cleaning device. A substrate cleaning device (substrate cleaning unit) is configured to scrub the surface of a rotating substrate with a roll-shaped or pencil-shaped sponge member while supplying chemical solutions, and finally rinse off the chemical solutions with rinse liquid such as pure water (Patent Literature 1, Patent Literature 2).

The substrate cleaning device described in Patent Literature 1 and Patent Literature 2 is mainly applied in the wiring process (BEOL: back end of line) that forms multilayer wiring using Cu etc. In recent years, due to the need for high-speed logic elements and low-cost memory elements, the application of CMP has been expanding even in transistor processes (FEOL: front end of line) that form switching circuits. Compared to BEOL, FEOL forms thinner films, narrower wiring widths, and smaller spaces between wirings, so it is essential to improve removal performance against particulate contamination, molecular contamination, and metal element contamination. As a means to achieve this, a cleaning method that utilizes the promotion of chemical action by heating the chemical solutions is considered promising. A cleaning device used for such cleaning is provided with a gas-water separator (also referred to as a gas-liquid separator) that performs gas-water separation of exhaust (Patent Literature 3, Patent Literature 4).

CITATION LIST

Patent Literature

[Patent Literature 1] JP 2002-043267 A
[Patent Literature 2] JP 2010-074191 A
[Patent Literature 3] JP 2003-124180 A
[Patent Literature 4] JP 2002-222791 A

Technical Problem

In a cleaning method that utilizes the promotion of chemical reactions by heating a chemical solution, steam is generated in the cleaning module by using the heated chemical solution. When exhausting the atmosphere containing this steam, liquid may not be sufficiently separated from the exhaust by a gas-liquid separator, and condensation may occur on the surface of the exhaust duct due to cooling of the steam. There exists a risk of liquid leakage from exhaust duct joints (for example, connection part between the exhaust duct of the cleaning module and the exhaust duct outside the cleaning module; connection part between the exhaust duct outside the cleaning module and the main exhaust duct of the equipment) due to the generated condensation. It is considered that steam may also contain chemical solution components, which may have a harmful effect on the human body when exposed to leaked liquid. Further, if liquid accumulates in the exhaust duct due to condensation, the exhaust pressure decreases, which may reduce the amount of exhaust of the cleaning module and lead to a deterioration in cleaning performance.

This application suppresses condensation in an exhaust duct of a substrate processing device for processing a substrate with a liquid.

SUMMARY

Solution to Problem

According to one embodiment, a substrate processing device includes: a processing module for processing a substrate with a liquid; and a gas-liquid separation tank connected to an exhaust outlet of the processing module, separating the liquid from an exhaust received from the processing module, and releasing the exhaust into an exhaust duct. The gas-liquid separation tank includes: a tank body; a heat exchanger arranged in the tank body and cooling the exhaust; and an air nozzle arranged in the tank body and supplying air for cooling the exhaust.

According to one embodiment, a polishing device includes: the substrate processing device.

According to one embodiment, a substrate processing method includes: processing a substrate with a liquid in a processing module; introducing exhaust from the processing module into a gas-liquid separation tank; in the gas-liquid separation tank, contacting the exhaust with a heat exchanger and air from an air nozzle so as to separate liquid from the exhaust and reduce temperature and humidity of the exhaust; and releasing the exhaust that has passed through the gas-liquid separation tank into an exhaust duct.

BRIEF DESCRIPTION OF THE DRAWINGS

FIG. 8 is an example recipe for a process in a substrate cleaning unit.

FIG. 9 illustrates experimental results indicating temperature and humidity inside an exhaust duct.

DESCRIPTION OF THE EMBODIMENTS

Figure 1:
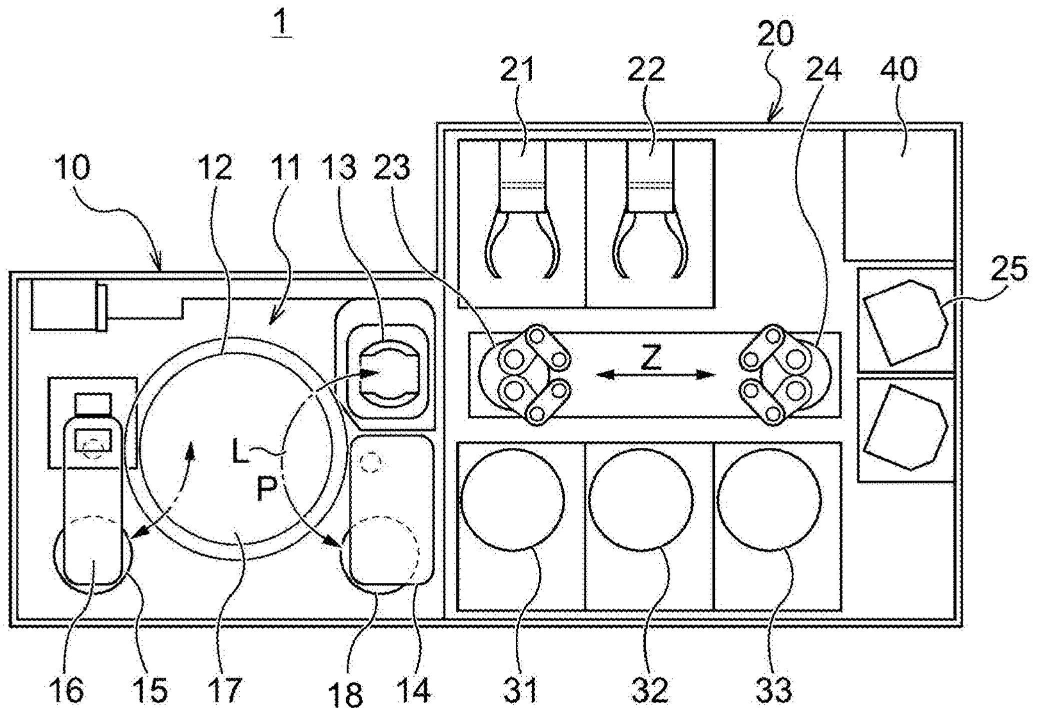
FIG. 1 is a schematic plan view of a substrate processing device provided with a substrate processing unit according to one embodiment.

Hereinafter, embodiments of a substrate processing device according to this disclosure will be described with reference to the accompanying drawings. In the accompanying drawings, the same or similar elements are given the same or similar reference numerals, and redundant descriptions of the same or similar elements may be omitted in the description of each embodiment. Also, features illustrated in each embodiment may be applied to other embodiments unless they contradict each other.

[Polishing Device]

FIG. 1 is a schematic plan view of a substrate processing device provided with a substrate processing unit according to one embodiment. Here, a polishing device 1, which is a CMP device, is given as an example as a substrate processing device. Note that this disclosure may be applied to any substrate processing device, not limited to the polishing device.

As illustrated in FIG. 1, the polishing device 1 includes a polishing portion 10 and a cleaning portion 20. The polishing portion 10 is provided with a polishing module 11 and a work transfer device 13 for transferring a substrate Wf. The polishing module 11 is configured to have a turntable 12 installed in the center, a polishing head 14 attached with a top ring 18 on one side, and a dressing unit 16 attached with a dressing tool 15 on the other side. Moreover, the cleaning portion 20 has two transport robots 23 and 24 that may move in the direction of arrow Z in the center; a primary substrate cleaning unit 31, a secondary substrate cleaning unit 32, and a spin drying device 33 with cleaning function that are arranged in parallel on one side, and two work flipping machines 21 and 22 for flipping the substrate Wf that are arrange on the other side.

Further, the polishing device 1 has a control device (controller) 40 configured to control each part of the device. The control device 40 has a memory storing a predetermined program and a CPU executing the program in the memory. The storage medium constituting the memory may include non-volatile and/or volatile storage medium. Some or all functions of the control device 40 may be configured with hardware such as ASICs. Some or all functions of the control device 40 may be configured with sequencers. Some or all of the control device 40 may be arranged inside and/or outside the housing of the polishing device 1. Some or all parts of the control device 40 are connected to communicate with each part of the polishing device 1 via wired and/or wireless communication.

Substrates Wf are taken out by a transport robot 24 one by one from a cassette 25 containing the substrates Wf before polishing and transferred to the work flipping machine 22, such that the substrates Wf are flipped and the polishing surfaces (for example, circuit pattern forming surfaces) face downward. Further, the substrates Wf are transferred from the work flipping machine 22 to the transport robot 23 and transported to the work transfer device 13 in the polishing portion 10.

The substrate Wf on the work transfer device 13, as indicated by arrow L, is held on the lower surface of the top ring 18 of the polishing head 14 and moved onto the turntable 12. While the top ring 18 and the turntable 12 are rotating, the substrate Wf is polished by being brought into contact with a polishing surface 17 (for example, the polishing surface of a polishing pad on the turntable 12). At this time, an abrasive liquid (slurry) is supplied from an unillustrated abrasive liquid supply pipe onto the polishing surface 17. After polishing, the substrate Wf is returned to the work transfer device 13 again, transferred to the work flipping machine 21 by the transport robot 23, rinsed with rinse liquid while being reversed, and then transferred to the primary substrate cleaning unit 31 by the transport robot 23.

In the substrate cleaning unit 31, a rotating roll-type cleaning member is made to abut on the upper and lower surfaces of the substrate Wf rotated by a buffering pad of a spindle, and a cleaning liquid is sprayed from a cleaning liquid nozzle to remove particles adhering to the upper and lower surfaces of the substrate Wf and flush them away with the cleaning liquid. The substrate Wf cleaned by the substrate cleaning unit 31 is transferred from the substrate cleaning unit 31 to the substrate cleaning unit 32 by the transport robot 23.

In the substrate cleaning unit 32, the outer periphery of the substrate Wf is held by a chuck of a rotating chuck mechanism, and the entire rotating chuck mechanism is rotated at high speed in this state. At this time, a rotating pencil-type cleaning member is made to abut on the upper and/or lower surface of the rotating substrate Wf, and cleaning liquid is supplied from the cleaning liquid nozzle to the upper and/or lower surface of the substrate Wf. At the same time, the pencil-type cleaning member is swung for cleaning.

The substrate Wf cleaned by the substrate cleaning unit 32 is transported to the spin drying device 33 (spin rinse dryer) with cleaning function by the transport robot 24. In the spin drying device 33, the substrate Wf is cleaned while rotating, and then the substrate Wf is rotated at a high speed to spin-dry. The dried substrate Wf is returned to the cassette 25 by the transport robot 24.

[Substrate Cleaning Unit]

Figure 2A:
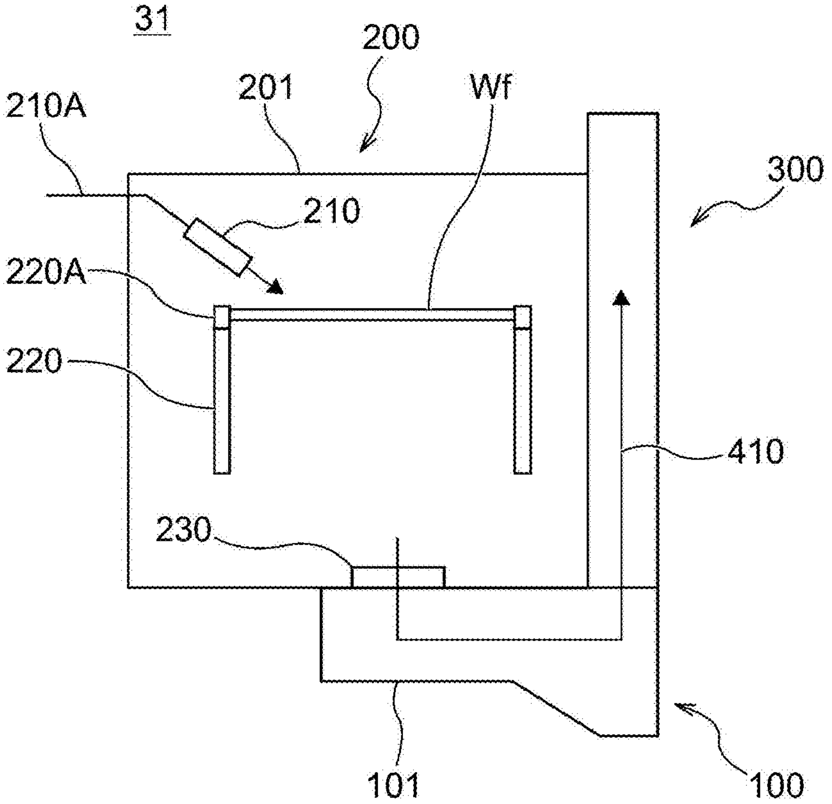
FIG. 2A is a schematic cross-sectional view of a substrate processing unit according to one embodiment.
Figure 2B:
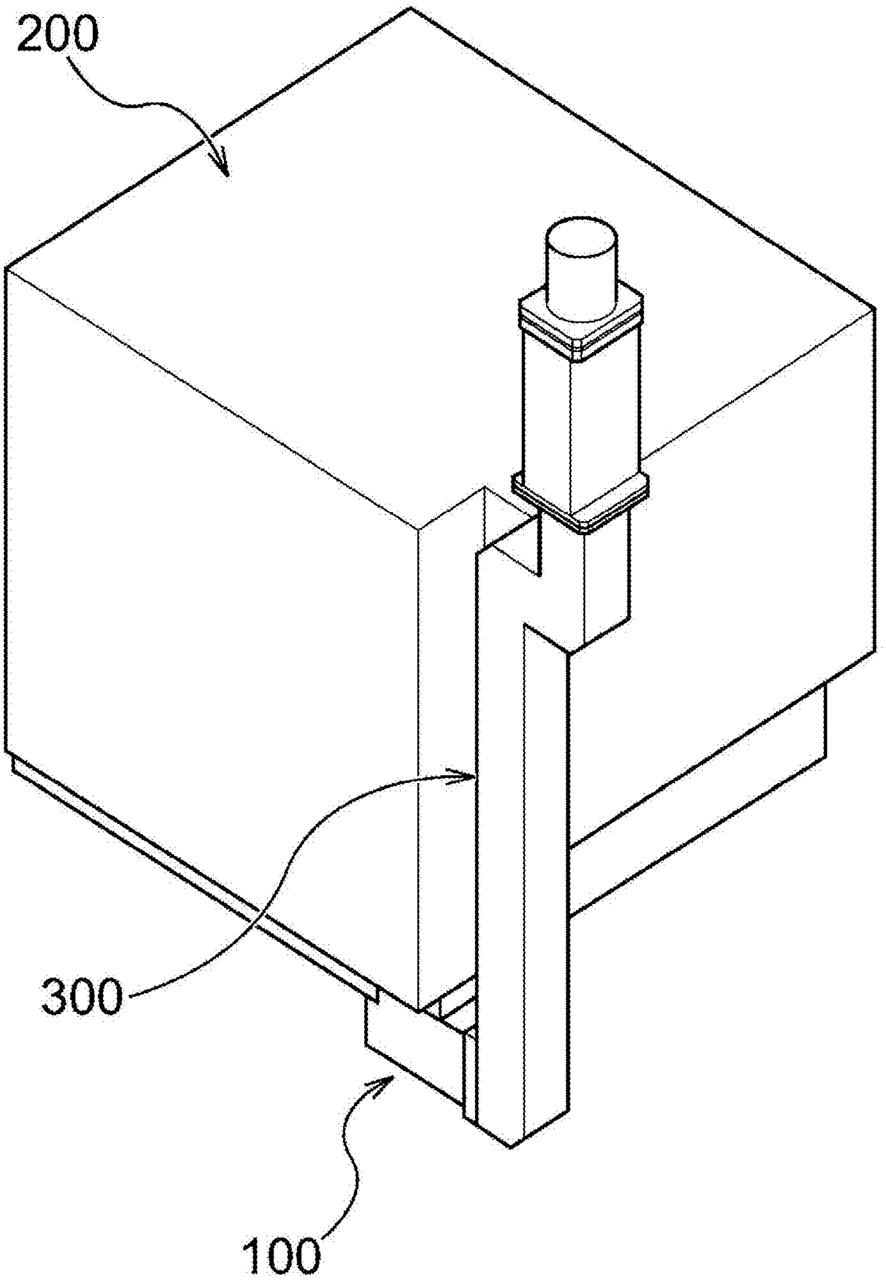
FIG. 2B is a perspective view of a substrate processing unit according to one embodiment.

FIG. 2A is a schematic cross-sectional view of a substrate processing unit according to one embodiment. FIG. 2B is a perspective view of a substrate processing unit according to one embodiment. Here, the substrate cleaning unit 31 is given as an example of a substrate processing unit. Although the substrate cleaning unit 31 and the substrate cleaning unit 32 differ in detailed configuration inside a cleaning module 200, they share the same method of processing exhaust from the cleaning module 200, thus the description of the embodiment using the substrate cleaning unit 31 as an example can be easily applied to the substrate cleaning unit 32. Further, this disclosure is not only limited to substrate cleaning units but can be applied to any substrate processing unit for processing a substrate using a liquid and exhausts an atmosphere containing steam of such liquid.

The substrate cleaning unit 31 includes the cleaning module 200, a gas-liquid separation tank 100, and an exhaust duct 300. The cleaning module 200 includes a tank body 201, a rotation mechanism (for example, multiple spindles 220 provided with a buffering pad 220A for holding the outer periphery of the substrate Wf) that rotates the substrate Wf in the tank body 201, a cleaning nozzle 210 that supplies a cleaning liquid (chemical solution, pure water, etc.) as a processing liquid to the upper and/or lower surface of the substrate Wf, and an exhaust outlet 230 that exhausts the atmosphere (including the steam of the cleaning liquid) inside the tank body 201. Moreover, in the case of the substrate cleaning unit 32, the rotation mechanism is a rotating chuck mechanism (described above) that includes a chuck that grips the outer periphery of the substrate Wf using a chuck of the rotating chuck mechanism. A line 210A indicates a line/pipe that supplies heated cleaning liquid and other cleaning liquids to the cleaning nozzle 210. For convenience of explanation, in FIG. 2A, only part of the configuration of the cleaning module 200 is illustrated, and other detailed configurations are omitted.

The gas-liquid separation tank 100 is attached to the bottom surface of the cleaning module 200 such that the upstream side of the gas-liquid separation tank 100 is fluidly connected with the exhaust outlet 230 of the cleaning module 200. The exhaust duct 300 is attached to a side surface of the cleaning module 200 such that the downstream side of the gas-liquid separation tank 100 is fluidly connected with the upstream side of the exhaust duct 300. Arrow 410 in FIG. 2A indicates the flow of exhaust from the cleaning module 200. The downstream side of the exhaust duct 300 is connected to an equipment exhaust duct main pipe by an exhaust duct (not illustrated) of a flexible tube. The flexible tube may have upward and downward curved portions, and if condensation occurs inside the flexible tube occurs, liquid may accumulate in locally lowered portion of the flexible tube, blocking the passage of the exhaust and reducing the exhaust capacity. Also, if condensation occurs inside the exhaust duct of the flexible tube, liquid leakage may occur at the connection part between an exhaust duct of a flexible tube and the cleaning module 200 (exhaust duct 300) and at the connection part between the flexible tube and an exhaust duct main pipe of equipment.

[Gas-Liquid Separation Tank]

Figure 3:
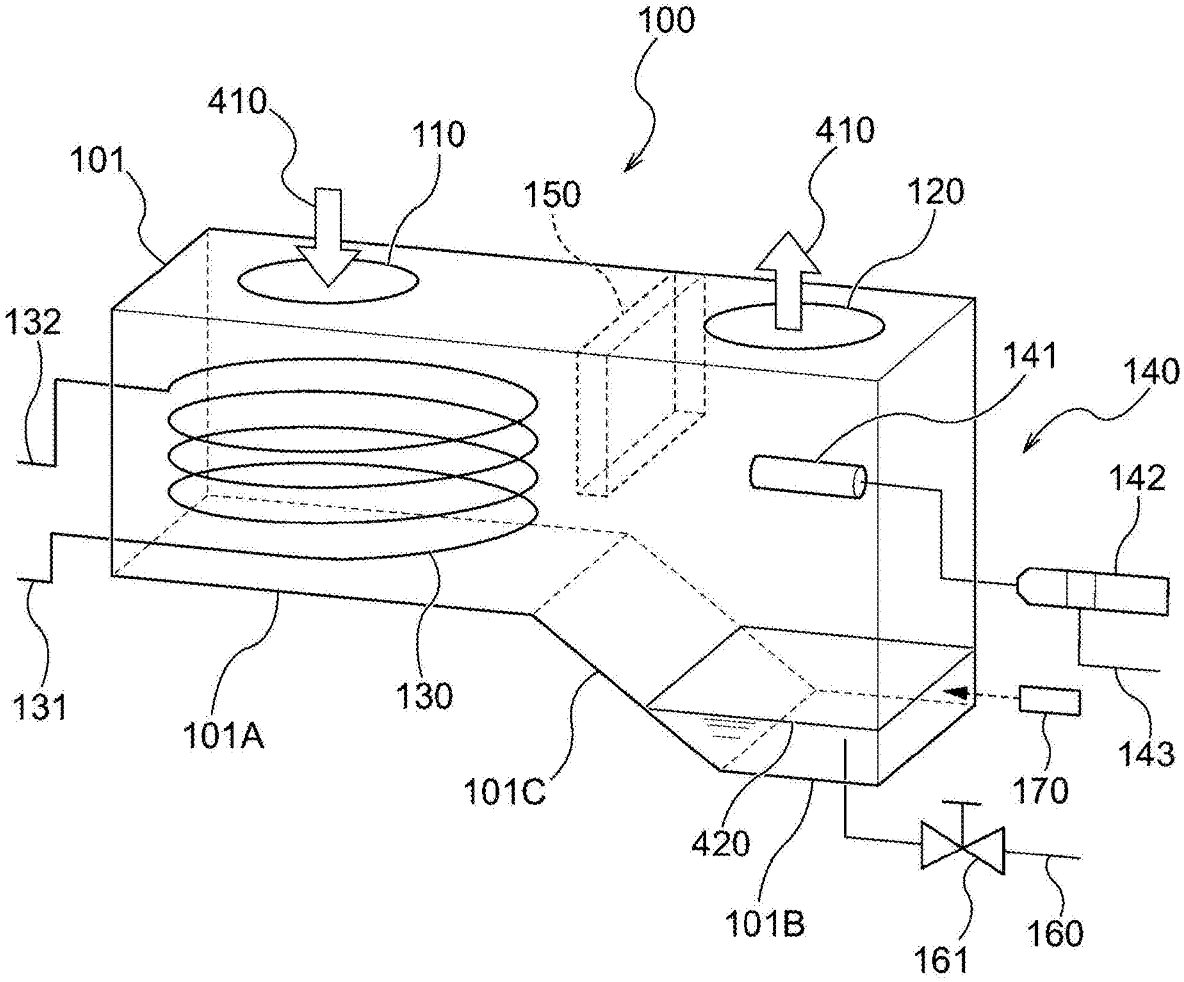
FIG. 3 is an example of configuration of a gas-liquid separation tank according to one embodiment.

FIG. 3 is an example of configuration of the gas-liquid separation tank 100 according to one embodiment. The gas-liquid separation tank 100 is provided with a tank body 101, a heat exchanger 130 arranged inside the tank body 101, and a cooling air supply mechanism 140 (air nozzle 141) provided for the tank body 101. Further, the gas-liquid separation tank 100 includes a baffle plate 150 provided inside the tank body 101. In this embodiment, inside the gas-liquid separation tank 100, the exhaust containing steam is cooled by the cooling air from the heat exchanger 130 and the cooling air supply mechanism 140 (air nozzle 141), forcibly condensing the steam to reduce the amount of steam in the exhaust, and suppressing condensation inside the exhaust duct (including the exhaust duct 300 and its downstream exhaust duct). The heat exchanger 130, the cooling air supply mechanism 140 (air nozzle 141, etc.), and the baffle plate 150 may be made of metal or resin. Moreover, from the viewpoint of preventing contamination when a substrate cleaning unit is arranged inside a semiconductor manufacturing device, it is preferable that the heat exchanger 130, the cooling air supply mechanism 140 (air nozzle 141, etc.), and the baffle plate 150 are made of resin (for example, PEEK, CNT-PEEK).

The tank body 101 has an exhaust inlet 110 and an exhaust outlet 120. The exhaust inlet 110 is fluidly connected to the exhaust outlet 230 of the cleaning module 200. The exhaust outlet 120 is fluidly connected to the exhaust inlet (not illustrated) of the exhaust duct 300. In the gas-liquid separation tank 100, the exhaust from the cleaning module 200 enters from the exhaust inlet 110, and after the liquid in the exhaust has been separated, flows out to the exhaust duct 300 through the exhaust outlet 230.

The heat exchanger 130 is arranged on the upstream side of the exhaust in the tank body 101. The heat exchanger 130 is installed so as to block the forward path of the exhaust and promote condensation by contacting the exhaust. However, it is arranged such that the heat exchanger 130 does not completely block the forward path of the exhaust and reduce the amount of exhaust does not decrease by. The heat exchanger 130 may be composed of a tube for flowing cooling water, a plate-like body (made of metal, resin) provided with an internal passage for flowing cooling water, etc. For example, as illustrated in FIG. 3, the heat exchanger 130 may be a tube provided with a cooling medium inlet 131 and a cooling medium outlet 132. When the heat exchanger 130 is composed of a tube, for example, as illustrated in FIG. 3, a tube wound in a spiral shape may be laid in the tank body 101, on the upstream side of the baffle plate 150. The cooling medium to be flowed into the heat exchanger 130 may be water or any other cooling medium. Since the temperature of the exhaust is about 30° C., the temperature of the cooling medium may be room temperature (for example, 25° C.).

Figure 5:
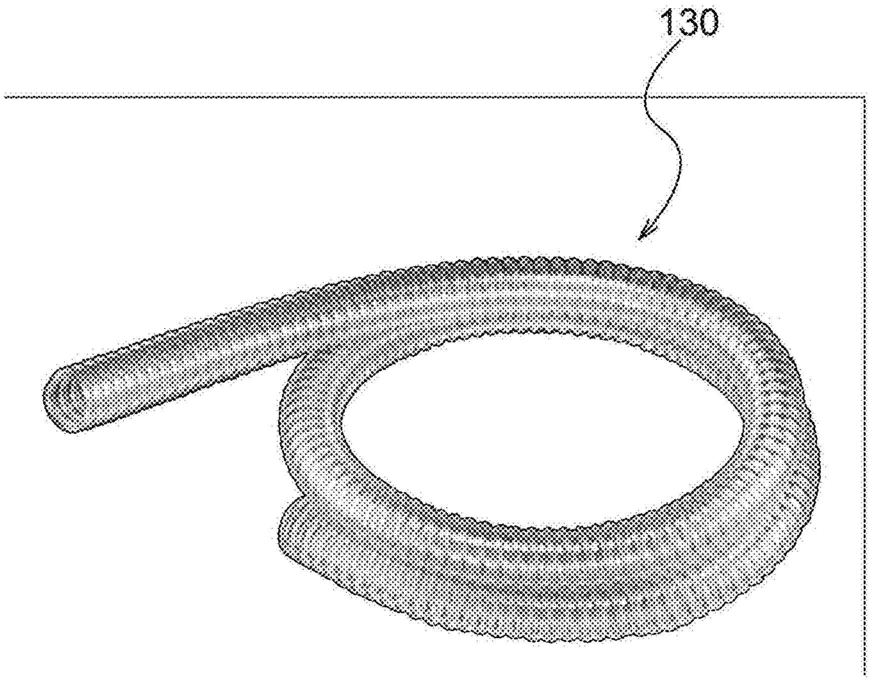
FIG. 5 is an example of configuration of a heat exchanger.

FIG. 5 is an example of the configuration of the heat exchanger 130. As illustrated in the drawing, the heat exchanger 130 may be a bellows tube. By composing the heat exchanger 130 with a bellows tube in this way, it is possible to increase the surface area of the heat exchanger 130 that contacts the exhaust and improve the cooling efficiency of the exhaust by the heat exchanger 130. Also, when arranging the bellows tube in a spiral shape, gaps through which exhaust passes are formed between adjacent tubes, so it is possible to suppress a decrease in the amount of exhaust.

The cooling air supply mechanism 140 includes the air nozzle 141 and an air cooler 142 in the example illustrated in FIG. 3. The air nozzle 141 supplies cooled compressed air (cooling air) into the tank body 101. It is preferable to install the air nozzle 141 to cool the entire inside of the gas-liquid separation tank 100 with cooling air. From the viewpoint of exhaust cooling efficiency, it is preferable that cooling air is blown from the air nozzle 141 to that exhaust that has become turbulent due to baffle 150, thus as illustrated in FIG. 3 for example, the air nozzle 141 is provided on the downstream side of the baffle plate 150. It is preferable that the air nozzle 141 is made of resin (for example, PEEK, CNT-PEEK).

Figure 4A:
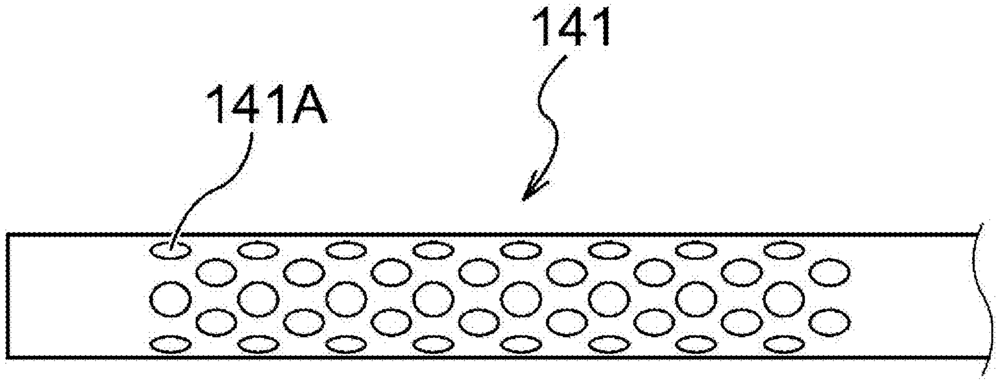
FIG. 4A is an example of configuration of an air nozzle.
Figure 4B:
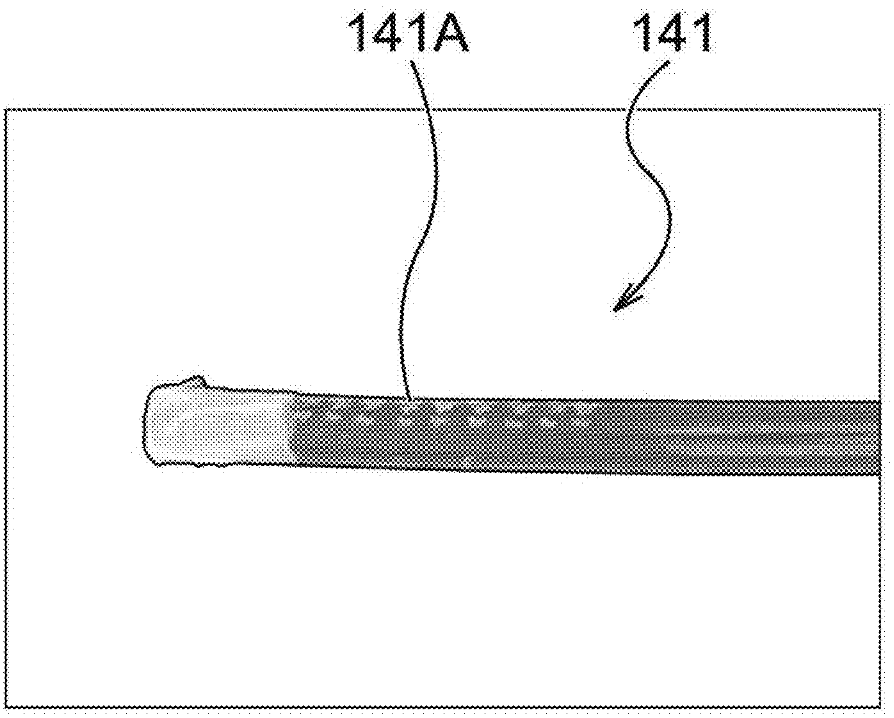
FIG. 4B is an example of configuration of an air nozzle.
Figure 4C:
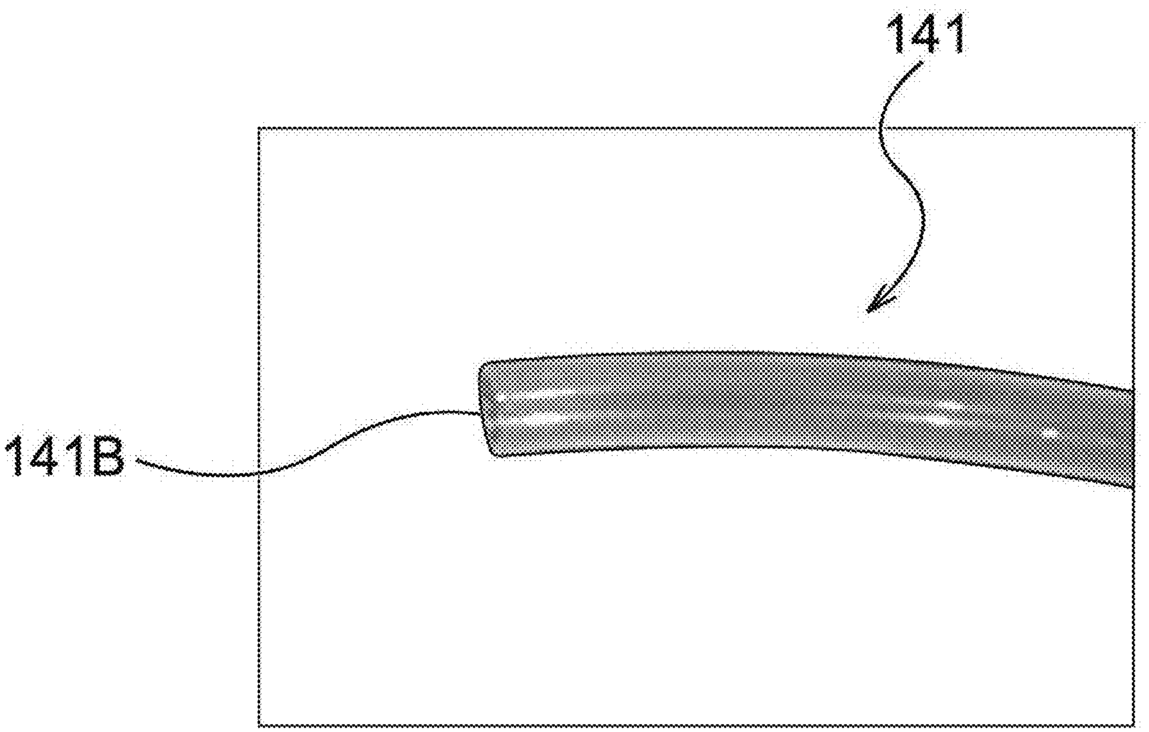
FIG. 4C is an example of configuration of an air nozzle.

The air nozzle 141 may be configured as illustrated in FIG. 4A to FIG. 4C. In FIG. 4A, the air nozzle 141 is a cylindrical body with multiple discharge holes 141A on a side surface of the cylindrical body. The discharge holes 141A are connected to an internal flow path extending longitudinally inside the cylindrical body, and discharge compressed air supplied to the internal flow path. At the tip of the cylindrical body, the internal flow path is closed. In the example of FIG. 4A, the discharge holes 141A are provided over the entire circumference in the circumferential direction of the cylindrical body within a predetermined length range. The configuration in FIG. 4A is suitable for uniformly cooling the entire tank body 101 of the gas-liquid separation tank 100.

In the example of FIG. 4B, the multiple discharge holes 141A are provided only on a part (for example, half-circumference) of the cylindrical body in the circumferential direction. Even in the example of FIG. 4B, at the tip of the cylindrical body, the internal flow path is closed. Compressed air can be efficiently supplied into the tank body 101 by providing multiple holes on a part of the side surface of the cylindrical body in the circumferential direction according to the shape of the space inside the tank body 101 and exhaust flow.

In the example of FIG. 4C, at the tip of the cylindrical body of the air nozzle 141, a discharge hole 141B that opens the internal flow path is provided, and no discharge hole 141A is provided on the side surface of the cylindrical body.

The air cooler 142 receives a supply of compressed air from a line 143 and supplies cooled compressed air to the air nozzle 141. For example, the air cooler 142 may be composed of a vortex tube. According to the vortex tube, it is possible to realize a simple configuration that separates compressed air supplied from the line 143 into high temperature compressed air and low temperature compressed air and outputs low temperature/cooled compressed air. Moreover, since the temperature of the exhaust is higher (about 30° C.) than room temperature (25° C.), the air cooler 142 may be omitted and room temperature air may be discharged from the air nozzle 141. However, from viewpoint of preventing condensation in the exhaust duct, it is preferable that air is compressed air of 0.4 MPa or more.

The air nozzle 141 may be installed in a position opposing the exhaust flow inside the tank body 101, for example, on the downstream side of the baffle plate 150. Also, the air cooler 142 may be installed outside the tank body 101 and fluidly connected to the air nozzle 141 inside the tank body 101 via a flow path. Moreover, the air nozzle 141 may be installed such that the compressed airflow from the air nozzle 141 is blown to the heat exchanger 130. For example, the air nozzle 141 may be placed on the upstream side of the baffle plate 150 (on the heat exchanger 130 side) such that compressed airflow from the air nozzle 141 is efficiently blown to the heat exchanger 130. In this way, cooling efficiency for the exhaust in the heat exchanger 130 can be further improved.

The baffle plate 150 is provided to generate turbulence by forming an up and down flow in the exhaust flow, thereby improving the mixing efficiency between the exhaust and the cooling air (compressed air) from the air nozzle 141. The baffle plate 150 may be cooled, for example, by circulating water through it to further increase the cooling efficiency. Since the exhaust from the processing module 200 is warm, it is preferable to provide the baffle plate 150 at the upper part of the tank body 101. In order to create an up and down flow in the exhaust, it is preferable that there is no gap between the left and right sides of the baffle plate 150 and the tank body 101. In the example of FIG. 3, the baffle plate 150 is attached to the ceiling of the tank body 101 at a position (approximately intermediate position) between the exhaust inlet 110 and the exhaust outlet 120. The baffle plate 150 is attached to a side surface of the tank body 101 such that no gap is formed in the left-right direction with respect to the side surface of the tank body 101. The baffle plate 150 preferably has a height that blocks about half of the flow path area.

Multiple baffle plates 150 may be provided. In a case where multiple baffle plates 150 are provided, it is preferable to provide the baffle plate 150 attached to the ceiling of the tank body 101 and the baffle plate 150 attached to the bottom surface of the tank body 101 such that the multiple baffle plates 150 are staggered in the up-down direction. By doing so, it is possible to further promote turbulence (mixing efficiency) in the flow.

The bottom surface of the tank body 101 has a sloping surface 101C. The sloping surface 101C is provided so as to descend from the upstream side to the downstream side. The bottom surface of the tank body 101 has a horizontal first bottom surface portion 101A (first height) on the upstream side of the sloping surface 101C and a horizontal second bottom surface portion 101B (second height (<first height)) on the downstream side of the sloping surface 101C due to the sloping surface 101C. A liquid 420 separated from exhaust by cooling in the gas-liquid separation tank 100 tends to accumulate in the second bottom surface portion 101B with lower height due to the sloping surface 101C.

A waste liquid line 160 is connected to the second bottom surface portion 101B of the tank body 101, and an electromagnetic valve 161 is provided on the waste liquid line 160. The electromagnetic valve 161 may be either an opening/closing valve or a flow control valve. In the gas-liquid separation tank 100, a liquid level sensor 170 for detecting the height of the liquid level of the liquid 420 is provided. The liquid level sensor 170 may be any type of liquid level sensor such as laser type, float type, etc. In this embodiment, the height of the liquid level of the liquid 420 is detected by the liquid level sensor 170, and when the height of the liquid level reaches a predetermined height, the electromagnetic valve 161 is opened to discharge the liquid 420 through the waste liquid line 160. In this way, it is possible to suppress a reduction in the amount of exhaust from the target cleaning module 200 due to constant exhaust from the waste liquid line 160 in addition to the exhaust duct 300.

The laser type liquid level sensor may be installed outside the tank body 101 at a predetermined height (a threshold value of the height of the liquid level of the liquid 420), and may output a laser light horizontally into the tank body 101 through the tank body 101 made of a transparent member or a transparent part of the tank body 101. When the height of the liquid level of the liquid 420 reaches the height of the laser light, intensity of reflected light from the laser light changes, and it is detected that the height of the liquid level of the liquid 420 has reached a predetermined height (threshold value). The float type liquid level sensor is installed at a predetermined height (a threshold value of height of liquid level of the liquid 420) inside the tank body 101, and when the height of liquid level of the liquid 420 touches the liquid level sensor, the resistance value or static capacitance value of the liquid level sensor changes, and the liquid level sensor detects that the height of liquid level of the liquid 420 has reached a predetermined height (threshold value).

[Flowchart for Waste Liquid Control]

Figure 6:
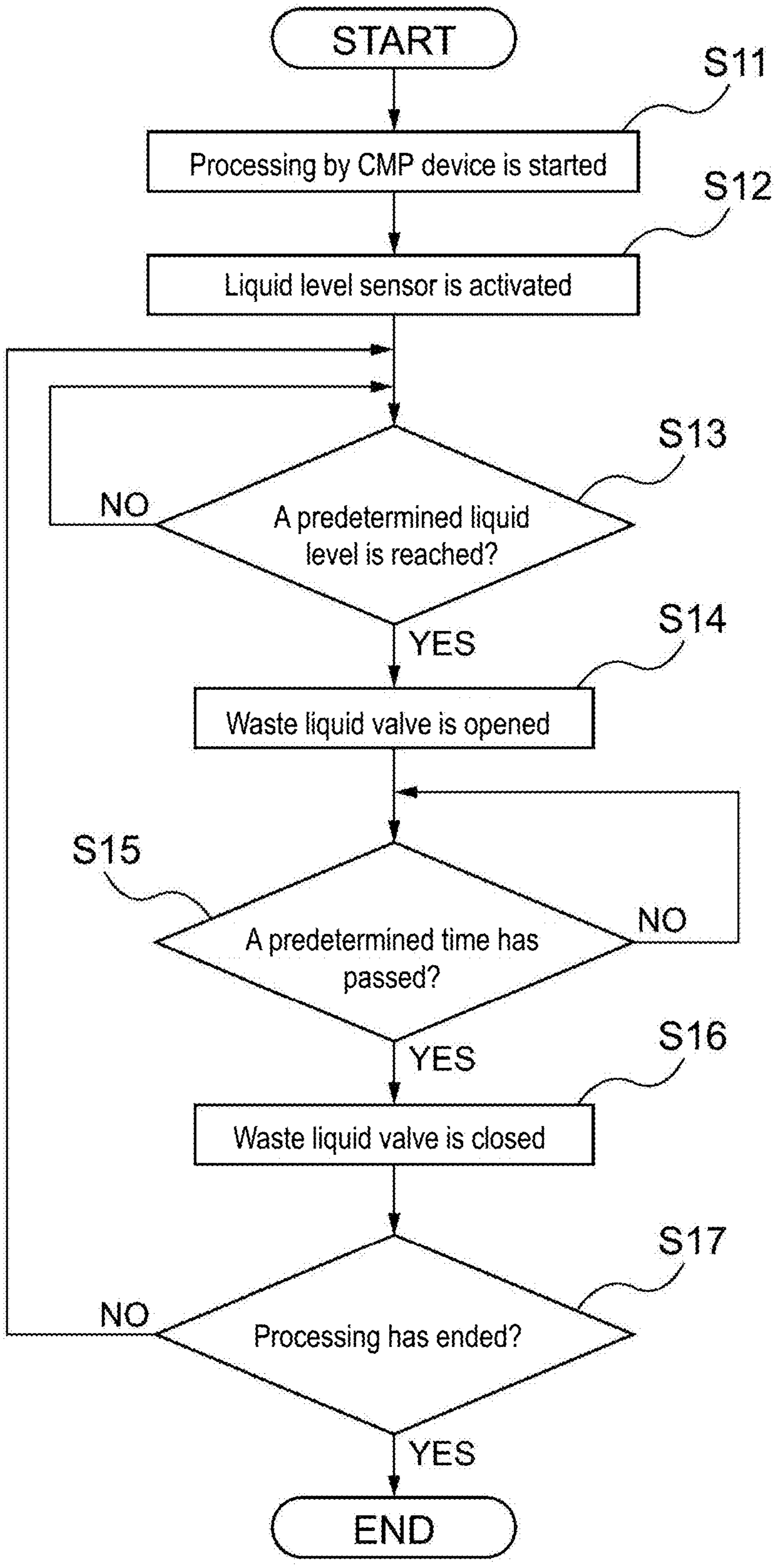
FIG. 6 is a flowchart illustrating waste liquid control in a gas-liquid separation tank.

FIG. 6 is a flowchart for waste liquid control in a gas-liquid separation tank. This control is executed by the control device 40.

In step S11, processing by the polishing device 1 (polishing module 11) is started.

In step S12, the liquid level sensor 170 in the gas-liquid separation tank 100 is activated.

In step S13, based on output from the liquid level sensor 170, it is determined whether or not height of liquid level of the liquid 420 has reached a predetermined threshold value. If the height of the liquid level has not reached the predetermined threshold value, the processing at step S13 is repeated, and when the height of the liquid level has reached the predetermined threshold value, the process proceeds to step S14.

In step S14, the electromagnetic valve 161 on the waste liquid line 160 is opened.

In step S15, it is determined whether or not a predetermined time has passed since the electromagnetic valve 161 is opened. If the predetermined time has not passed, the processing at step S15 is repeated; if the predetermined time has passed, the process proceeds to step S16.

In step S16, the electromagnetic valve 161 is closed.

In step S17, it is determined whether or not the processing of the polishing device 1 has ended. If the processing of the polishing device 1 has not ended, the process returns to step S13. On the other hand, if the processing of the polishing device 1 is ended, the processing according to this flowchart is ended.

[Flowchart of Cooling Control]

Figure 7:
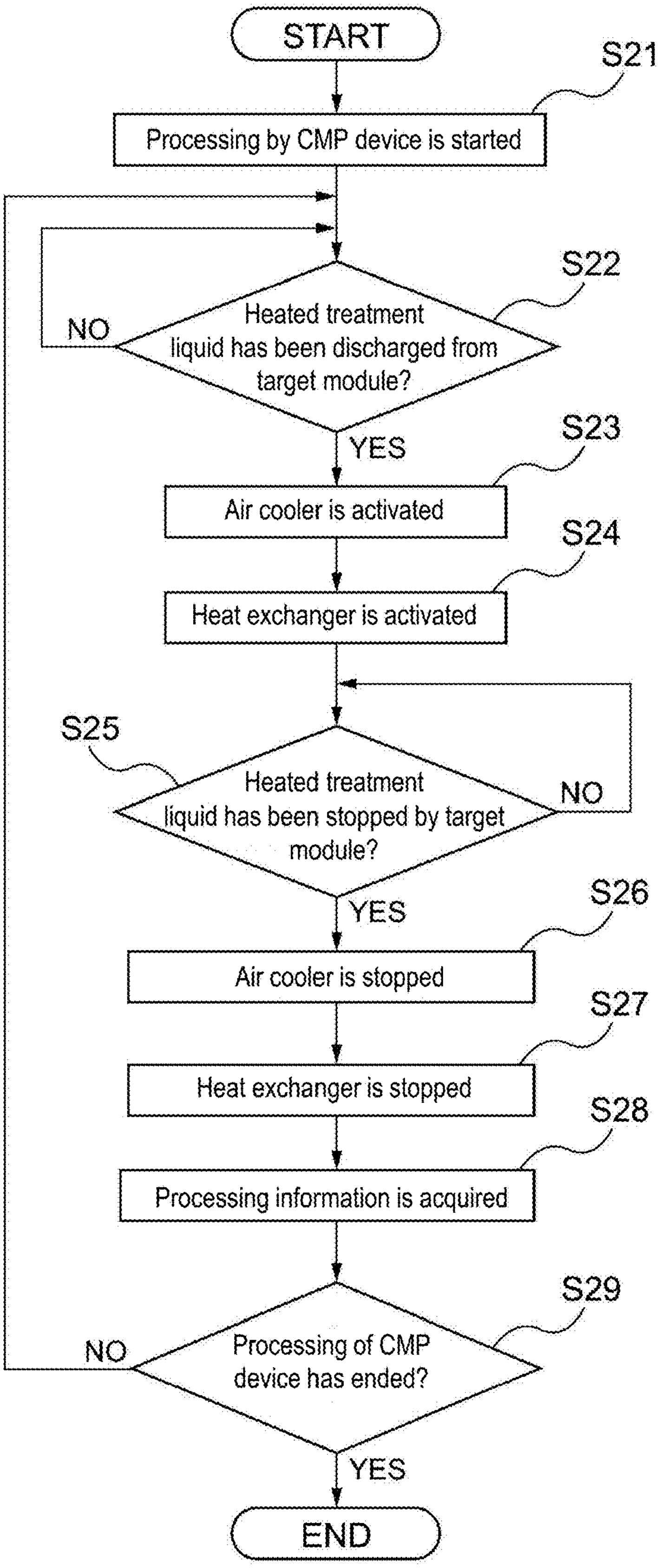
FIG. 7 is a flowchart of cooling sequence in a gas-liquid separation tank.

FIG. 7 is a flowchart of cooling sequence of the gas-liquid separation tank. Triggered by a signal that a heated treatment liquid (heated chemical solution, heated water) is discharged from the target cleaning module 200 using a heated treatment liquid, the air cooler 142 and the heat exchanger 130 are activated (air cooler activation: introducing compressed air; heat exchanger activation: circulating cooling water). The cooling is performed until the discharge of the heated treatment liquid in the cleaning module 200 is stopped. The processing status of the polishing device 1 is obtained, and if the processing of the polishing device 1 continues, the process waits until another trigger appears. If the processing of the polishing device 1 is ended, the sequence is ended.

In step S21, processing of the polishing device 1 (polishing module 11) is started.

In step S22, it is determined whether or not a heated treatment liquid has been discharged from the target cleaning module 200. This determination may be made based on a signal that a heated treatment liquid has been discharged from the cleaning module 200. If no heated treatment liquid has been discharged, the processing of step S22 is repeated. On the other hand, if a heated treatment liquid has been discharged, the air cooler 142 is activated (step S23), and the heat exchanger 130 is activated (step S24). Thus, in the gas-liquid separation tank 100, exhaust from the cleaning module 200 may be cooled by the compressed air from the heat exchanger 130 and the air nozzle 141. The activation of the air cooler 142 may be starting supply of compressed air to the air cooler 142 and discharging cooled compressed air from the air nozzle 141. However, in a case where normal temperature air/compressed air is discharged from the air nozzle 141, the air cooler 142 is omitted and "air cooler activation" may be read as "air nozzle activation" (discharging air from air nozzle) instead. Also, in the case where the air nozzle 141 is activated, air is also discharged from the air nozzle, thus it may be generally referred to as "air nozzle activation" regardless of presence or absence of an air cooler. The activation of the heat exchanger 130 may be starting circulation of cooling water in the bellows tube of the heat exchanger.

In step S25, it is determined whether or not the discharge of the heated treatment liquid from the target cleaning module 200 has stopped. This determination may be made by monitoring a signal that the cleaning module 200 has discharged the heated treatment liquid (for example, confirming the disappearance of the signal). If the discharge of the heated treatment liquid from the cleaning module 200 has not stopped, the processing of step S25 is repeated. If the discharge of the heated treatment liquid from the cleaning module 200 has stopped, the air cooler 142 is stopped (step S26), and the heat exchanger 130 is stopped (step S27).

In step S28, processing information such as the presence or absence of a subsequent substrate to be processed by the polishing device 1 is acquired, and in step S29, it is determined whether or not the processing of the polishing device 1 has ended. If the processing of the polishing device 1 has not ended, the process returns to step S22. On the other hand, if the processing of the polishing device 1 has ended, the processing of this flowchart is ended.

[Example of Recipe]

FIG. 8 is an example of a recipe for the processes in a substrate cleaning unit. In this figure, Step1 represents cleaning of the substrate Wf with pure water: DIW (deionized water) in the cleaning module 200. Step2 represents cleaning of the substrate Wf with heated chemical solution in the cleaning module 200. Step3 represents cleaning of the substrate Wf with DIW in the cleaning module 200. In each Step, items indicating whether or not the processing liquid is heated (Heated Liquid), and items setting whether or not to use a cooling system (air nozzle, heat exchanger) of the gas-liquid separation tank 100 (Cooling System) may be set. "Heated liquid" being "N" indicates that the processing liquid is not heated, and "heated liquid" being "Y" indicates that the processing liquid is heated. "Cooling system" being "invalid" indicates that the cooling system is not activated, and "cooling system" being "valid" indicates that the cooling system is activated. The cooling system is activated in steps where "cooling system" is "valid". As an alternative to determining whether or not a heated treatment liquid is discharged from the cleaning module 200 in FIG. 7 (S22, S25), control of activation of cooling system (air nozzle, heat exchanger) may be based on a recipe as illustrated in FIG. 8.

Experimental Results

FIG. 9 illustrates experimental results indicating the temperature and humidity inside an exhaust duct. As illustrated in the figure, without the countermeasures of the cooling system (air nozzle, heat exchanger) of the gas-liquid separation tank 100 according to the above embodiment, the temperature inside the exhaust duct 300 was 33°, and the humidity was 100%. In contrast, when implementing the countermeasures of the cooling system of the gas-liquid separation tank 100, the temperature inside the exhaust duct 300 dropped to 19°, and the humidity dropped to 94%. Also, the exhaust speed in the exhaust duct 300 was 5.3 m/s when no countermeasures were taken for the cooling system of the gas-liquid separation tank, and it was 5.4 m/s when measures were implemented for the cooling system of the gas-liquid separation tank. Thus, it was found that according to the cooling system of the gas-liquid separation tank 100 according to the above embodiment, while maintaining the exhaust speed, it is possible to reduce the temperature and humidity of the exhaust in the exhaust duct 300 and suppress or prevent condensation inside the exhaust duct 300.

Other Embodiments (1) In the above embodiment, an example of providing a cooling system in a gas-liquid separation tank of a substrate cleaning unit has been described, but it is possible to apply the above embodiment to any substrate processing unit or substrate processing device for processing a substrate with a liquid and exhausts the atmosphere in a processing space. For example, since the exhaust from a polishing module 11 where heated slurry and/or pad temperature control is used may be hot and humid, a cooling system (heat exchanger 130, cooling air supply mechanism 140) of the above embodiment may be installed in an exhaust path of polishing module 11. A tank (which may also serve as a gas-liquid separation tank) may be provided in an exhaust path of polishing module 11, and a cooling system may be placed in this tank.

(2) Any substrate processing unit or substrate processing device for processing a substrate with a liquid and exhausts gas may be placed within a substrate processing device/system other than a polishing device (for example, plating device/system).

Although several embodiments of this disclosure have been described so far, these embodiments are intended to facilitate understanding of this disclosure and do not limit this disclosure. It is needless to say that this disclosure may be modified and improved without departing from its spirit, and that equivalents are included in this disclosure. Also, within a range that may solve at least some of the problems mentioned above or achieve at least some of the effects, any combination or omission of each component described in the claims and specification is possible.

This application discloses, as one embodiment, a substrate processing device including: a processing module for processing a substrate with a liquid; and a gas-liquid separation tank connected to an exhaust outlet of the processing module, separating the liquid from an exhaust received from the processing module, and releasing the exhaust into an exhaust duct. The gas-liquid separation tank includes a tank body; a heat exchanger arranged inside the tank body and cooling the exhaust; and an air nozzle arranged within the tank body and supplying air for cooling the exhaust. The exhaust duct may include an exhaust duct integrally provided with the gas-liquid separation tank, and/or an exhaust duct provided separately from the gas-liquid separation tank.

According to this embodiment, in the gas-liquid separation tank, reducing the temperature of the exhaust by the heat exchanger and reducing the temperature of the exhaust by air from the air nozzle reduces may facilitate separation of the liquid from the exhaust. This effectively reduces the temperature and humidity of the exhaust in the gas-liquid separation tank, suppressing or preventing condensation in the exhaust duct.

By suppressing condensation in the exhaust duct, liquid leakage from joints in the exhaust duct can be suppressed, which improves safety. Also, by suppressing condensation in the exhaust duct, changes in amount of exhaust can be suppressed, which stabilizes substrate processing performance (for example, cleaning performance).

This application discloses, as one embodiment, a substrate processing device, in which the processing module processes the substrate using a heated liquid.

In the processing module, when a heated liquid is used as a processing liquid (heated treatment liquid), the temperature and humidity of the exhaust increase, making it easier for condensation to occur in the exhaust duct. In this case, by reducing the temperature and humidity of the exhaust with a heat exchanger and air from an air nozzle, it is possible to effectively suppress or prevent condensation in the exhaust duct.

Moreover, even when using an unheated liquid as a processing liquid, by reducing the temperature and humidity of the exhaust with a heat exchanger and compressed air from an air nozzle, it is possible to more reliably suppress or prevent condensation in the exhaust duct.

This application discloses, as one embodiment, a substrate processing device, in which the heat exchanger includes a tube through which a cooled liquid flows.

According to this embodiment, it is possible to configure a heat exchanger simply. Also, by using flexible tubes, it is easy to install a heat exchanger within limited space inside of tank body of gas-liquid separation tank. This can improve flexibility in installing heat exchangers within gas-liquid separation tanks.

This application discloses, as one embodiment, a substrate processing device, in which the tube is a bellows tube.

According to this embodiment, it is possible to increase surface area of heat exchanger that contacts with exhaust, thereby improving cooling efficiency (heat exchange efficiency) of the exhaust.

This application discloses, as one embodiment, a substrate processing device which further includes: an air cooler connected to the nozzle, in which the air cooler receives supply of air and outputs cooled air to the nozzle.

According to this embodiment, it is possible to adjust the air to a desired temperature by the air cooler, and reduce the temperature of the exhaust more efficiently.

This application discloses, as one embodiment, a substrate processing device, in which the air cooler is a vortex tube.

According to this embodiment, it is possible to configure the air cooler simply and/or compactly.

This application discloses, as one embodiment, a substrate processing device, in which the air is compressed air.

According to this embodiment, it is possible to effectively suppress or prevent condensation within the exhaust duct.

This application discloses, as one embodiment, a substrate processing device, in which a direction of discharge of the air from the nozzle is directed towards the heat exchanger.

According to this embodiment, it is possible to cool the heat exchanger and the exhaust around the heat exchanger by the air from the air nozzle, and improve the cooling efficiency of the exhaust by the heat exchanger.

This application discloses, as one embodiment, a substrate processing device, in which the nozzle has a cylindrical body with multiple holes provided on a side surface.

According to this embodiment, it is easy to supply air throughout the tank body in the gas-liquid separation tank from multiple holes on the side surface of the cylindrical body. It is suitable for uniformly cooling the entire tank body of the gas-liquid separation tank.

This application discloses, as one embodiment, a substrate processing device, in which the multiple holes are provided over entire circumference or a partial range of the side surface in the circumferential direction.

According to this embodiment, when multiple holes are provided over the entire circumference of the side surface of the cylindrical body, it is suitable for uniformly cooling inside of the tank body by releasing air in all directions (up, down, left and right). Also, by providing multiple holes in part of the side surface of cylindrical body in the circumferential direction according to the shape of the space inside of tank body and flow of exhaust, it is possible to uniformly cool inside of tank body.

This application discloses, as one embodiment, a substrate processing device, in which the gas-liquid separation tank further includes a baffle plate that redirects a direction of flow of exhaust from the processing module.

According to this embodiment, by creating an up-and-down flow in the exhaust flow by the baffle plate and generating turbulence, mixing efficiency between cooling air and exhaust can be improved and separation of liquid in exhaust and reduction of temperature and humidity of exhaust can be promoted.

This application discloses, as one embodiment, a substrate processing device, in which the heat exchanger is arranged on an upstream side of the baffle plate inside the tank body, and the air nozzle is arranged on a downstream side of the baffle plate in the tank body.

According to this embodiment, by arranging heat exchanger and air nozzle on each side of the baffle plate, arrangement of heat exchanger, air nozzle and related piping, and machine becomes easy. Also, by blowing cooling air against turbulent exhaust caused by baffle plate, mixing efficiency between cooling air and exhaust can be further improved.

This application discloses, as one embodiment, a substrate processing device, in which the heat exchanger has a baffle plate with a passage through which a cooled liquid flows.

According to this embodiment, by cooling the baffle plate itself, the cooling efficiency can be improved. Moreover, by functioning the baffle plate as a heat exchanger and omitting or miniaturizing another heat exchanger, it is possible to save space in the gas-liquid separation tank.

This application discloses, as one embodiment, a substrate processing device, in which the heat exchanger further has a tube through which a cooled liquid flows, apart from the baffle plate.

According to this embodiment, since exhaust is cooled by both the baffle plate of the heat exchanger and the tube of the cooling fluid, cooling efficiency can be further improved.

This application discloses, as one embodiment, a substrate processing device, which further includes: a waste liquid line connected to the tank body of the gas-liquid separation tank; a valve provided on the waste liquid line; a liquid level sensor that detects height of a liquid level of the liquid accumulated in the tank body of the gas-liquid separation tank; and a control device that opens the valve in response to detecting that the height of the liquid level has reached a predetermined height based on an output of the liquid level sensor.

According to this embodiment, by discharging waste liquid after a predetermined amount of liquid separated from exhaust has accumulated, it is possible to prevent or suppress a decrease in amount of exhaust of processing modules by constantly drawing exhaust from not only exhaust ducts but also waste liquid lines.

This application discloses, as one embodiment, a substrate processing device, in which a bottom surface of the tank body has a first bottom surface portion at a first height, a second bottom surface portion with a second height, which is lower than the first height, located on a downstream side of the exhaust from the first bottom surface portion, and a sloping surface connecting the first bottom surface portion and the second bottom surface portion; and the waste liquid line is connected to the second bottom surface portion.

According to this embodiment, it is possible to efficiently collect liquid separated from exhaust at a lower second bottom surface portion by a sloping surface at the bottom of tank body and more efficiently discharge liquid from gas-liquid separation tank.

This application discloses, as one embodiment, a substrate processing device, which further includes: an exhaust duct attached to a side surface of processing module, in which the gas-liquid separation tank is attached to a bottom surface of the processing module so as to fluidly communicate with processing module and the exhaust duct.

According to this embodiment, it is possible to compactly configure a substrate processing device including a gas-liquid separation tank.

This application discloses, as one embodiment, a substrate processing device, in which the processing module is a cleaning module, and the substrate processing device is a substrate cleaning device.

According to this embodiment, when implementing substrate cleaning method utilizing promotion of chemical action by heated processing liquid, it is possible to effectively prevent or suppress condensation inside exhaust duct of a substrate cleaning device.

This application discloses, as one embodiment, a polishing device, which includes the substrate processing device. In recent years, due to the need for high-speed logic elements and low-cost memory elements, the application of CMP (Chemical Mechanical Polishing) has been expanding even in transistor processes (FEOL: front end of line) that form switching circuits. Compared to BEOL (back end of line) wiring processes that form multilayer wiring with Cu and others, FEOL forms thinner film thickness, narrower wiring width, and smaller spaces between wirings, so it is essential to improve removal performance against particulate contamination, molecular contamination, and metal element contamination. As a means to achieve this, a cleaning method that utilizes promotion of chemical reactions by heating the processing liquid (chemical solution, pure water) is considered promising. In such a cleaning method, according to the substrate processing device/substrate cleaning device of the above embodiment, it is possible to effectively suppress or prevent condensation in the exhaust duct.

This application discloses, as one embodiment, a substrate processing method (exhaust method of the substrate processing device), which includes: processing a substrate with a liquid in a processing module; introducing exhaust from the processing module into a gas-liquid separation tank; in the gas-liquid separation tank, contacting the exhaust with a heat exchanger and air from an air nozzle so as to separate liquid from the exhaust and reduce temperature and humidity of the exhaust; and releasing the exhaust that has passed through the gas-liquid separation tank into an exhaust duct.

According to this embodiment, in the gas-liquid separation tank, reducing the temperature of the exhaust by the heat exchanger and reducing the temperature of the exhaust by air from the air nozzle reduces may facilitate separation of the liquid from the exhaust. This effectively reduces the temperature and humidity of the exhaust in the gas-liquid separation tank, suppressing or preventing condensation in the exhaust duct.

By suppressing condensation in the exhaust duct, liquid leakage from joints in the exhaust duct can be suppressed, which improves safety. Also, by suppressing condensation in the exhaust duct, changes in amount of exhaust can be suppressed, which stabilizes substrate processing performance (for example, cleaning performance).

What is claimed is:

1. A substrate cleaning device, comprising:

a cleaning module for processing a substrate with a liquid, and a gas-liquid separation tank connected to an exhaust outlet of the cleaning module, separating the liquid from an exhaust received from the cleaning module, and releasing the exhaust to an exhaust duct, wherein the gas-liquid separation tank comprises:

a first tank body;

a heat exchanger arranged in the first tank body and cooling the exhaust, and an air nozzle arranged in the first tank body and supplying air for cooling the exhaust, wherein the cleaning module comprises:

a second tank body, a rotation mechanism that rotates the substrate in the second tank body, a cleaning nozzle that supplies a cleaning liquid to the upper and/or lower surface of the substrate, and an exhaust outlet that exhausts steam from the cleaning liquid inside the second tank body, wherein the heat exchanger is arranged on an upstream side of a baffle plate in the first tank body, and the air nozzle is arranged on a downstream side of the baffle plate in the first tank body.

2. The substrate cleaning device according to claim 1, wherein the cleaning module processes the substrate using a heated liquid.

3. The substrate cleaning device according to claim 1, wherein the heat exchanger has a tube through which a cooled liquid flows.

4. The substrate cleaning device according to claim 3, wherein the tube is a bellows tube.

5. The substrate cleaning device according to claim 1, further comprising:

an air cooler connected to the nozzle, wherein the air cooler receives supply of air and outputs cooled air to the nozzle.

6. The substrate cleaning device according to claim 5, wherein the air cooler is a vortex tube.

7. The substrate cleaning device according to claim 1, wherein the air is compressed air.

8. The substrate cleaning device according to claim 1, wherein a direction of discharge of the air from the nozzle is directed towards the heat exchanger.

9. The substrate cleaning device according to claim 1, wherein the nozzle has a cylindrical body with multiple holes provided on a side surface.

10. The substrate cleaning device according to claim 1, wherein multiple holes are provided over entire circumference or a partial range of a side surface of the nozzle in a circumferential direction.

11. The substrate cleaning device according to claim 1, wherein the gas-liquid separation tank further comprises a baffle plate that redirects a direction of flow of exhaust from the cleaning module.

12. The substrate cleaning device according to claim 1, wherein the heat exchanger comprises:

a tube for flowing cooling water, and a plate-like body provided with an internal passage for flowing the cooling water.

13. The substrate cleaning device according to claim 1, wherein the heat exchanger further has a tube through which a cooled liquid flows, apart from the baffle plate.

14. The substrate cleaning device according to claim 1, further comprising:

a waste liquid line connected to the first tank body of the gas-liquid separation tank;

a valve provided on the waste liquid line;

a liquid level sensor that detects height of a liquid level of the liquid accumulated in the first tank body of the gas-liquid separation tank; and a control device that opens the valve in response to detecting that the height of the liquid level has reached a predetermined height based on an output of the liquid level sensor.

15. The substrate cleaning device according to claim 14, wherein a bottom surface of the first tank body has a first bottom surface portion with a first height, a second bottom surface portion with a second height, which is lower than the first height, located on a downstream side of the exhaust from the first bottom surface portion, and a sloping surface connecting the first bottom surface portion and the second bottom surface portion, and the waste liquid line is connected to the second bottom surface portion.

16. The substrate cleaning device according to claim 1, further comprising:

an exhaust duct attached to a side surface of the cleaning module, wherein the gas-liquid separation tank is attached to a bottom surface of the cleaning module so as to fluidly communicate with the cleaning module and the exhaust duct.

17. A polishing device, comprising:

a polishing portion comprising a polishing module for polishing a substrate and a work transfer device for transferring the substrate, wherein the polishing module is configured to have a turntable installed in the center, a polishing head attached with a top ring on one side, and a dressing unit attached with a dressing tool on the other side; and a cleaning portion comprising the substrate cleaning device according to claim 14.

* * * * *